(12) United States Patent
Smit et al.

(10) Patent No.: US 6,320,197 B1
(45) Date of Patent: Nov. 20, 2001

(54) METHOD AND A DEVICE FOR TREATING CULTIVATION PRODUCTS OR CULTIVATION MEDIA, AND CULTIVATION PRODUCTS OBTAINED WITH THE METHOD

(75) Inventors: Jacobus Cornelis Smit, Schagen; Herman Dijkman, Lochem, both of (NL)

(73) Assignee: Simco Nederland B.V. (NL)

( * ) Notice: Subject to any disclaimer, the term of this patent is extended or adjusted under 35 U.S.C. 154(b) by 0 days.

(21) Appl. No.: 09/155,376

(22) PCT Filed: Mar. 11, 1997

(86) PCT No.: PCT/NL97/00119

§ 371 Date: Feb. 25, 1999

§ 102(e) Date: Feb. 25, 1999

(87) PCT Pub. No.: WO97/35464

PCT Pub. Date: Oct. 2, 1997

(30) Foreign Application Priority Data

| Mar. 26, 1996 | (NL) | .................................................. | 1002706 |
| Dec. 3, 1996 | (NL) | .................................................. | 1004681 |

(51) Int. Cl.$^7$ .................................................. H01J 37/00
(52) U.S. Cl. .................................................. 250/492.1
(58) Field of Search .................... 250/492.1, 453.11, 250/455.11

(56) References Cited

U.S. PATENT DOCUMENTS

| 4,458,153 | * | 7/1984 | Wesley | .................................. 250/435 |
| 5,012,110 | * | 4/1991 | Kropp | .................................. 250/492.1 |
| 5,138,172 | * | 8/1992 | Kropp | .................................. 250/492.1 |

FOREIGN PATENT DOCUMENTS

| 1034762 | 7/1978 | (CA) . |
| 3804052 | 8/1989 | (DE) . |
| 1231676 | 9/1960 | (FR) . |
| 2474814 | 8/1981 | (FR) . |
| WO9111096 | 8/1991 | (WO) . |
| WO9636207 | 11/1996 | (WO) . |

OTHER PUBLICATIONS

Abstract of Russian Patent No. 1152540, Apr. 1985, 1 page.
Abstract of Russian Patent No. 1706419, Jan. 1992, 1 page.

* cited by examiner

*Primary Examiner*—Kiet T. Nguyen
(74) *Attorney, Agent, or Firm*—Webb Ziesenheim Logsdon Orkin & Hanson, P.C.

(57) ABSTRACT

A method and device for treating cultivation products or a cultivation medium, for instance cultivated soil or a growth substrate, against micro-organisms, for instance nematodes. The cultivation products or cultivation medium to be treated are placed in an electric and/or a magnetic field and held therein for a certain minimum time.

9 Claims, 1 Drawing Sheet

METHOD AND A DEVICE FOR TREATING CULTIVATION PRODUCTS OR CULTIVATION MEDIA, AND CULTIVATION PRODUCTS OBTAINED WITH THE METHOD

It is a known problem that cultivation products such as bulbous plants, for instance lilies or also potatoes, are often damaged by micro-organisms such as nematodes, insects, fungi, bacteria and viruses. Such micro-organisms are often to be found in cultivated soil or other cultivation media and plant tissues such as that of roots, bulbs and tubers and other plant parts, and affect this tissue when the cultivation products are re-planted.

It is an object of the invention to provide a method and a device using which cultivation products or cultivation media can be effectively treated such that damage to cultivation products is effectively prevented, whereby the effective yield of these cultivation products can be increased considerably.

In respect of the above the invention provides a method for treating cultivation products or a cultivation medium, for instance cultivated soil or a growth substrate, against micro-organisms, for instance nematodes, according to which method the cultivation products for treating are placed in an electric and/or a magnetic field and held therein for a certain minimum time.

DETAILED DESCRIPTION OF THE PREFERRED EMBODIMENTS

Figure 1:
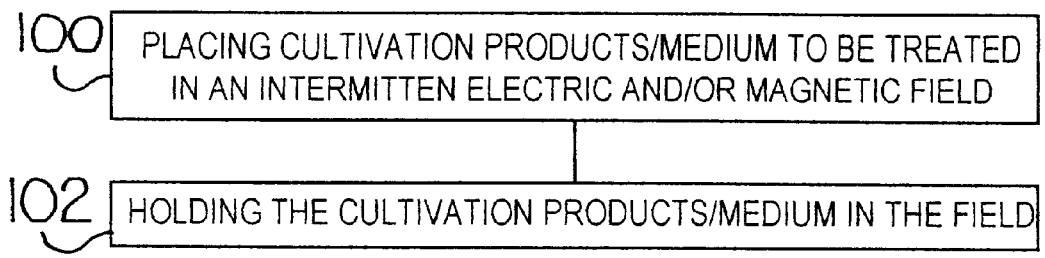
FIG. 1 is a flow diagram of a preferred embodiment of a method according to the present invention.

The present invention includes a method for treating cultivation products or cultivation medium, such as cultivated soil or growth substrate, against micro-organisms such as nematodes. As illustrated in FIG. 1, the method includes placing the material to be treated in an electric field or a magnetic field or both (step 100) and holding the material therein for a certain minimum amount of time (step 102).

The method according to the invention influences the so-called "diapause", or the moment at which larvae emerge from the egg. Without being able to go into the still partly uncomprehended action, it can be stated that the method according to the invention results in an effective biological disruption of the animal organisms whereby for instance a larva emerges unnaturally quickly from the egg, whereby chances of survival are considerably reduced. In respect of the effectiveness of the disruption of the animal organisms it has been established that the method according to the invention does not affect the surrounding vegetable tissue, or does so only to a negligible extent.

A preferred embodiment has the special feature that the field is an alternating field.

Very good results have been achieved with a method wherein the field is an intermittent field. This embodiment can be embodied such that use can be made of pulses. Pulses can be deemed in this context for instance as relatively short-lived variations in a value 0, wherein in a relatively short time a maximum value is reached which subsequently decreases again to the value 0. The pulses are preferably rounded such that the spectral widening remains as limited as possible. This prevents radiation and other disturbances at undesired frequencies. The repetition frequency can lie for instance in the range 30–200 Hz. The pulse width can lie for instance in the order of magnitude of 0.2–2 ms and, in the case of a magnetic field, the peak value can lie in the investigated case in the order of magnitude of 800 $\mu$T.

A very practical embodiment has the feature that the field has a frequency corresponding with the mains frequency. The mains frequency has the advantage of easy availability and can usually avoid the problem of means being required to generate specific frequencies.

The field strength must have a value such that the micro-organisms can perceive the field and are thus stimulated to leave the environment in question or undergo a change in life-cycle. Conversely, the field strength may not be so great that danger to humans could occur. A particular embodiment which complies with these criteria has the special feature that the field is a magnetic field and the field strength at the position of the cultivation products for treating has a maximum value in the range of roughly 0.5–1,000 $\mu$T.

Attention is drawn to the fact that an alternating field does not necessarily have to display a harmonic progression. Other waveforms are also possible. The phase of an alternating current can for instance be cut into by means of a thyristor control whereby in each case only a first part of a slope is effective from the zero line. A modulated pulse width with adjustable duty cycle can also be applied.

Figure 2:
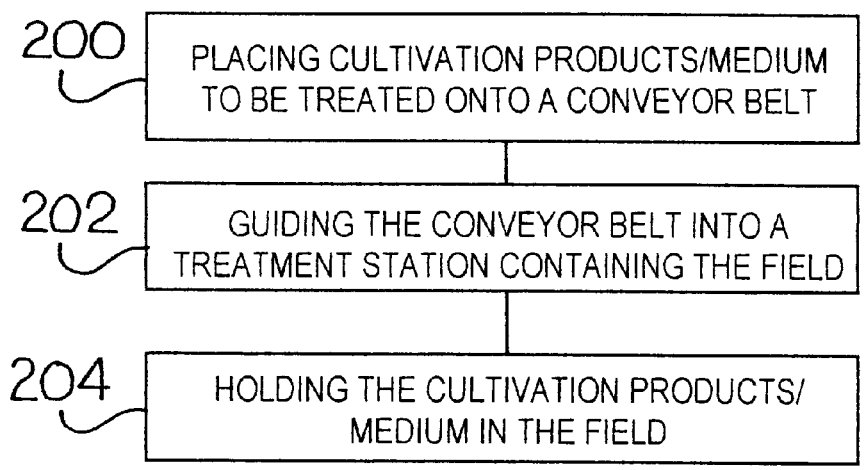
FIG. 2 is a flow diagram of another preferred embodiment of a method according to the present invention.

A very practical embodiment has the special feature that the cultivation products for treating are guided on a conveyor belt through a treatment station in which they are subjected to a method according to the invention. As seen in FIG. 2, in this embodiment, the method entails: placing cultivation products or cultivation medium to be treated onto a conveyor belt (step 200); guiding the conveyor belt into a treatment station containing the intermittent field (step 202); and holding the cultivation products or cultivation medium in the field (step 204). It is in any case already usual to transport the cultivation products on a conveyor belt in a treatment station. Adjacently of such a conveyor belt can be placed a treatment station according to the invention which is adapted to generate an electric and/or a magnetic field for the purpose of performing the above specified method according to the invention.

Finally, the invention relates to cultivation products and cultivation media obtained with a method according to the invention.

Figure 3:
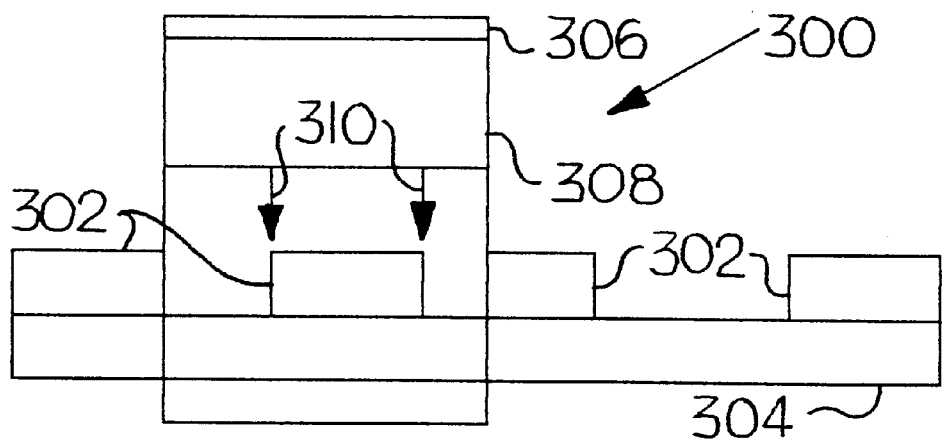
FIG. 3 is a block diagram of a device according to the present invention.

A device 300 according to the present invention is illustrated in FIG. 3. In particular, the device 300 treats cultivation products 302 or cultivation medium 302 against micro-organisms. The cultivation products/medium 302 to be treated is placed on a conveyor belt 304. The conveyor belt 304 is guided into a treatment station 306, which includes a means 308 for generating an intermittent electric field 310 or an intermittent magnetic field 310 or both. The device 300 is positioned near the conveyor belt 304, which acts as the means for positioning cultivation products/medium 302.

What is claimed is:

1. A method for treating cultivation products or a cultivation medium against micro-organisms comprising the steps of:

placing cultivation products or a cultivation medium to be treated in an intermittent electric field or an intermittent magnetic field or both; and holding the cultivation products or cultivation medium in the field.

2. The method as claimed in claim 1, wherein the field has a frequency corresponding with a mains frequency.

3. The method as claimed in claim 1, wherein the field is a magnetic field and the field strength at the position of the cultivation products for treating has a maximum value in the range of about 0.5–1,000 $\mu$T.

4. The method as claimed in claim 1, wherein the field has a frequency of about 30–200 Hz.

5. The method as claimed in claim 1, wherein said step of placing cultivation products or cultivation medium to be treated comprises placing the cultivation products or cultivation medium to be treated onto a conveyor belt and guiding the conveyor belt into a treatment station containing the field.

6. A treated cultivation product or cultivation medium prepared according to the method as claimed in claim 1.

7. A device for treating cultivation products or a cultivation medium against micro-organisms comprising:

means for generating an intermittent electric field or an intermittent magnetic field or both, said device being adapted to be placed in the vicinity of means for positioning cultivation products or a cultivation medium.

8. The device as claimed in claim 7 wherein said means for generating produces a field having a frequency corresponding to a mains frequency.

9. The device as claimed in claim 7, wherein said means for generating produces a field having a frequency of 30–200 Hz.

* * * * *

UNITED STATES PATENT AND TRADEMARK OFFICE
CERTIFICATE OF CORRECTION

PATENT NO. : 6,320,197 B1  Page 1 of 1
DATED : November 20, 2001
INVENTOR(S) : Jacobus Cornelis Smit et al.

It is certified that error appears in the above-identified patent and that said Letters Patent is hereby corrected as shown below:

Column 1,
Line 6, after the Title, insert the following headings and paragraph:

--            BACKGROUND OF THE INVENTION
                 1) Field of the Invention
     The present invention relates to a method for treating cultivation products or cultivation medium, in particular for attacking micro-organisms growing therein.
                 2) Prior Art --.

Between lines 20 and 21, insert the following heading:

-- SUMMARY OF THE INVENTION --.

Signed and Sealed this

Twenty-seventh Day of August, 2002

Attest:

JAMES E. ROGAN
Attesting Officer     Director of the United States Patent and Trademark Office